(12) United States Patent
Karunakaran et al.

(10) Patent No.: US 10,377,933 B2
(45) Date of Patent: Aug. 13, 2019

(54) ANTIFOG COATING COMPOSITION AND METHOD OF MAKING THEREOF

(71) Applicants: Raghuraman Govindan Karunakaran, Bangalore (IN); Indumathi Ramakrishnan, Bangalore (IN); Andreas Haeuseler, Nordhein-Westfalen (DE); Keith J. Weller, Rensselaer, NY (US)

(72) Inventors: Raghuraman Govindan Karunakaran, Bangalore (IN); Indumathi Ramakrishnan, Bangalore (IN); Andreas Haeuseler, Nordhein-Westfalen (DE); Keith J. Weller, Rensselaer, NY (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 609 days.

(21) Appl. No.: 14/995,417

(22) Filed: Jan. 14, 2016

(65) Prior Publication Data
US 2017/0204313 A1    Jul. 20, 2017

(51) Int. Cl.
*C08K 3/18* (2006.01)
*C09D 133/12* (2006.01)
*C09K 3/18* (2006.01)
*C09D 4/06* (2006.01)

(52) U.S. Cl.
CPC ............... *C09K 3/18* (2013.01); *C09D 4/06* (2013.01); *C09D 133/12* (2013.01)

(58) Field of Classification Search
CPC ................ C09K 3/18; C09D 133/12
USPC ........................................ 524/284
See application file for complete search history.

(56) References Cited

U.S. PATENT DOCUMENTS

| 5,180,760 | A | 1/1993 | Oshibe | |
|---|---|---|---|---|
| 5,244,935 | A | 9/1993 | Oshibe | |
| 8,106,124 | B2 | 1/2012 | Ougitani | |
| 2003/0203991 | A1* | 10/2003 | Schottman | C08K 3/22 523/334 |
| 2005/0074557 | A1* | 4/2005 | Patchen | C09K 3/18 427/421.1 |
| 2010/0304150 | A1* | 12/2010 | Zheng | C09D 183/06 428/414 |
| 2013/0308189 | A1 | 11/2013 | Gloege | |

FOREIGN PATENT DOCUMENTS

| EP | 1845141 | 10/2007 |
|---|---|---|
| JP | 2004-182914 | 7/2004 |

OTHER PUBLICATIONS

International Searching Authority European Patent Office, International Search Report and Writte Opinion for International Application No. PCT/US2016/067113, dated Jul. 17, 2017.

* cited by examiner

*Primary Examiner* — Deve E Valdez
(74) *Attorney, Agent, or Firm* — McDonald Hopkins LLC; James Abruzzo

(57) ABSTRACT

The present technology relates to an antifog coating composition comprising a matrix, a hydrophilic compound, and a surfactant. The antifog coating composition may further comprise a thermal or a photo-initiator. The antifog coating composition may be applied to a polycarbonate substrate.

19 Claims, No Drawings

ANTIFOG COATING COMPOSITION AND METHOD OF MAKING THEREOF

FIELD

The present technology relates to an antifog coating composition, methods of making an antifog coating composition, and articles comprising antifog coatings formed from such compositions. In particular, the present technology relates to an antifog coating composition comprising a matrix, a hydrophilic component, and a surfactant. The antifog coating composition may further comprise a thermal or a photo-initiator. The antifog coating compositions may be applied to a substrate, such as a plastic substrate, to coat the substrate. The coatings exhibit good adhesion and excellent antifog properties.

BACKGROUND

Fogging occurs when the surface temperature of a material is lower than the dew point of water vapor, resulting in condensation of the water vapor on the material. Fogging of automobile headlights, windshields, mirrors, eyeglasses, swimming goggles, camera lens, etc., can be problematic.

Current antifog coatings are normally prepared by physically introducing hydrophilic moieties into a polymer matrix without any chemical bond formation. A simple process such as melt blending produces antifog surfaces, however, the hydrophilic moieties may wear off during cleaning of the coating and stable long-term application cannot be assured. Thus, there remains a need for robust, long-life, antifog coatings.

SUMMARY

The present technology provides, in one aspect, an antifog coating composition comprising at least one thermoplastic matrix or polymer matrix, at least one hydrophilic component, and at least one surfactant. The antifog coating composition can be applied to a substrate to prevent fogging. In an embodiment, the antifog coating composition further comprises a thermal initiator or a photo-initiator.

In one embodiment, the matrix is an acrylate matrix. In one embodiment, the thermoplastic matrix comprises poly(methylmethacrylate) (PMMA) or polycarbonate (PC), polyether ether ketone (PEEK), polyimide (PI) or a combination thereof.

In one embodiment, the hydrophilic compound is a hydrophilic mono- or multifunctional acrylate comprises the formula (I):

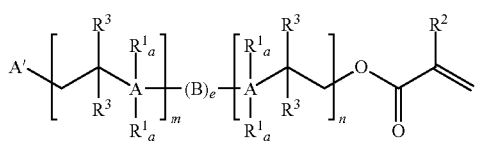

wherein:
$R_1$ is independently selected from the group consisting of O; H; a linear alkyl group containing from 1 to 5 carbon atoms; a linear alkyl group containing from 1 to 5 carbon atoms substituted with a hydroxy or an alkoxy group; an aromatic group; a hydroxy group; an alkoxy group containing from 1 to 3 carbon atoms; a methacrylate, and an acrylate group; wherein a is an integer from 0 to 1;

$R_2$ is independently chosen from H or $CH_3$;

$R_3$ is independently selected from the group consisting of H, an alkyl group having from 1 to 6 carbon atoms, a hydroxy group, an alkoxy group having from 1 to 3 carbon atoms, a methacrylate, and an acrylate group;

A is independently selected from the group consisting of 0, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, an alkylene oxide, and a substituted or unsubstituted divalent heterocyclic group having from 5 to 20 carbon atoms;

A' is independently selected from H, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, a methacrylate, and an acrylate group;

B is independently selected from 0, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, and a bisphenol A unit; wherein e is an integer from 0 to 1;

wherein n is an integer from 1 to 5 and m is an integer from 0 to 5.

In one embodiment, the hydrophilic mono- or multifunctional acrylate is selected from a poly(ethyleneoxy)methacrylate, a poly(ethyleneoxy)acrylate, a poly(ethyleneoxy) monomethylether acrylate, a poly(ethyleneoxy) monomethylether methacrylate, a pentaerythritol triacrylate, a glycerol dimethacrylate, a glycerol diacrylate, a bisphenol-A-glycerol tetraacrylate, a bisphenol-A-glycerol diacrylate, a bisphenol-A-ethyleneoxy diacrylate, or a combination of two or more thereof.

In one embodiment, the hydrophilic compound is a hydrophilic epoxy compound comprising the formula (II):

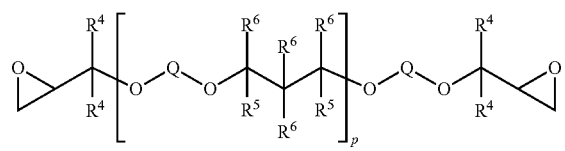

wherein:
$R_4$, $R_5$, and $R_6$ are independently chosen from H, a linear alkyl group having from 1 to 5 carbon atoms, an aromatic group, a hydroxy group, or an alkoxy group having from 1 to 3 carbon atoms;

Q is independently chosen from a linear alkylene group having from 1 to 6 carbon atoms, a cycloalkylene group having from 6 to 10 carbon atoms, a divalent aromatic group having 6 to 20 carbon atoms, or a divalent heterocyclic group having from 5 to 20 carbon atoms; and wherein p is an integer from 0 to 5.

In one embodiment, the hydrophilic epoxy compound is a bisphenol-A substituted epoxy group.

In one embodiment, the thermoplastic matrix is an acrylate matrix.

In one embodiment, the thermoplastic matrix may be chosen from polyether esters, polyester esters, thermoplastic polyurethanes (TPU), styrene ethylene butadiene styrene (SEBS), acrylonitrile butadiene styrene (ABS), styrene acrylonitrile (SAN), polyamide (PA), acrylate styrene acrylate block copolymer (ASA), polybutylene terephthalate (PBT), polycarbonate (PC), polyether block amide (PEBA), polyalkyl methacrylates and acrylates, including polymethyl methacrylate (PMMA), polyoxymethylene (POM), polyvinylchloride (PVC), polyether ether ketone (PEEK), polyimide (PI), or a combination of two or more thereof.

In one embodiment, the surfactant is a non-ionic surfactant. In one embodiment, the non-ionic surfactant is selected from a fatty alcohol, cetyl alcohol, stearyl alcohol, cetostearyl alcohol, oleyl alcohol, or a combination of two or more thereof.

In one embodiment, the surfactant is selected from sorbitan esters; polyethoxylated sorbitan esters; oleochemical derivative (e.g, Finafog PET (tradename), from Fine Organics); PEG monolaurate; polyethylene glycol octadecyl ether (e.g., BRIJ® O20, from Sigma Aldrich); polyoxyethylene stearyl ether; polyoxyethylene nonylphenyl ether, branched (e.g, Igepal® CO 720, from Sigma Aldrich); poly(oxyethylene) tridecyl ether; PEG-20 sorbitan monolaurate (e.g, Tween® 20, from Sigma Aldrich); PEG-20 sorbitan monolearate (e.g, Tween® 80, from Sigma Aldrich); sorbitan monostearate (e.g., Span® 60, from Sigma Aldrich), methacrylate Tween® 20 (from Sigma Aldrich), SiO$_2$-Tween® 20 (from Sigma Aldrich), Grand 6047 (from Momentive), Ecosure EH-9 (from Dow Chemicals), Mecostat® 3/752 (from Mecastat), Mecostat® 3/749 (from Mecostat) or a combination of two or more thereof. In one embodiment, the surfactant is a suitable sorbitan ester. Suitable sorbitan esters include, but are not limited to Tweens (e.g., Tween® 20, Tween® 80, methacrylate Tween® 20, and SiO$_2$-Tween® 20 all are from Sigma Aldrich) and Spans (e.g., Span® 60).

In one embodiment, the surfactant is selected from a sorbitan ester, a polyethoxylated sorbitan ester, a polyoxyethylene glycol alkyl ether; a polyoxypropylene glycol alkyl ether; a glucoside alkyl ether; a polyoxyethylene glycol octylphenol ether; a polyoxyethylene glycol alkylphenol ether; a polyoxyethylene glycol sorbitan alkyl ester; a sorbitan alkyl ester; or a combination of two or more thereof.

In one embodiment, the surfactant is selected from an oleochemical derivative (e.g., Finafog PET), PEG monooleate, PEG monolaurate, polyethylene glycol octadecyl ether (e.g., BRIJ® 020), polyoxyethylene nonylphenyl ether, branched (e.g., Ipegal® CO 720, poly(oxyethylene) tridecyl ether; PEG-20 sorbitan monolaurate (e.g., Tween® 20); PEG-20 sorbitan monolearate (e.g., Tween® 80); sorbitan monostearate (e.g., Span® 60), Methacrylate Tween® 20, SiO$_2$-Tween® 20, or a combination of two or more thereof.

In one aspect of the invention, the antifog coating composition comprises a polymer matrix, a hydrophilic compound, a surfactant, and a photo-initiator or a thermal initiator. In one embodiment, the thermal initiator comprises benzoyl peroxide or 4,4'-azobisisobutyronitrile (AIBN). In another embodiment, the photo-initiator comprises bis(2,4,6-trimethylbenzoyl)-phenylphosphineoxide (Irgacure® 819, from BASF); 1-Hydroxycyclohexyl phenyl ketone (Irgacure® 184, from BASF); or a combination of two or more thereof.

In one aspect of the invention, the antifog coating composition comprises about 10-70 wt % PMMA, about 10-40 wt % glycerol dimethacrylate, about 10-40 wt % of a surfactant, and about 2-5 wt % 1-Hydroxycyclohexyl phenyl ketone (Irgacure® 184, from BASF).

In another aspect of the invention, the antifog composition comprises a coating formulation comprising about 40-65 wt % PMMA, about 15-20 wt % glycerol dimethacrylate, about 15-20 wt % of a surfactant, and about 2-5 wt % 1-Hydroxycyclohexyl phenyl ketone (Irgacure® 184, from BASF).

In one embodiment of the invention, the matrix includes poly(methylmethacrylate)(PMMA); the hydrophilic mono- or multifunctional component is selected from poly(ethyleneoxy)methacrylate, poly(ethyleneoxy)-acrylate, poly(ethyleneoxy)monomethylether acrylate, poly(ethyleneoxy)-monomethylether methacrylate, pentaerythritol triacrylate, glycerol dimethacrylate, glycerol diacrylate, bisphenol-A-glycerol tetraacrylate, bisphenol-A-glycerol diacrylate, bisphenol-A-ethyleneoxy diacrylate, or combination of two or more thereof; and a surfactant chosen from an oleochemical derivative (e.g., Finafog PET), poly(ethyleneglycol) monolaurate, poly(ethyleneglycol) monooleate, poly(ethyleneglycol) sorbitan monolaurate (e.g., Tween 20), poly(oxyethylene) (10) tridecyl ether, polyethylene glycol octadecyl ether (e.g., BRIJ® 20, polyoxyethylene nonylphenyl ether, branched (e.g., Igepal® 720, sorbitan monostearate (Span® 60), Grand 6047, Ecosure EH-9, Mecostat® 3/752, Mecostat® 3/749 or a combination of two or more thereof.

In one aspect of the invention, the antifog compositions comprises a hydrophilic mono- or multifunctional acrylate such as poly(ethyleneoxy)methacrylate, poly(ethyleneoxy) acrylate, poly(ethyleneoxy)-monomethylether acrylate, poly(ethyleneoxy)monomethylether methacrylate, pentaerythritol triacrylate, glycerol dimethacrylate, glycerol diacrylate, bisphenol-A-glycerol tetraacrylate, bisphenol-A-glycerol diacrylate, bisphenol-A-ethyleneoxy diacrylate, or a combination of two or more thereof added onto the matrix comprising a thermoplastic (e.g., PMMA) and at least one surfactant selected from, an oleochemical derivative (e.g., Finafog PET), poly(ethyleneglycol) monolaurate, poly(ethyleneglycol) monooleate, poly(ethyleneglycol) sorbitan monolaurate (e.g., Tween® 20), poly(oxyethylene) (10) tridecyl ether, polyethylene glycol octadecyl ether (e.g., BRIJ® 20), polyoxyethylene nonylphenyl ether, branched (e.g., Igepal® 720), Grand 6047, Ecosure EH-9, Mecostat® 3/752, Mecostat® 3/749, sorbitan stearate (e.g., Span® 60), or a combination of two or more thereof.

In one aspect, the present technology provides a substrate where at least a portion of a surface thereof is coated with an antifog composition in accordance with any of the foregoing aspects or embodiments. In embodiments, the substrate is chosen from an acrylic polymer, a polyamide, a polyimide, an acrylonitrile-styrene copolymer, a styrene-acrylonitrile-butadiene terpolymer, a polyvinyl chloride, a polyethylene, a polycarbonate, a copolycarbonate, a high-heat polycarbonate, or a combination of two or more thereof.

These and other aspects and embodiments are further understood with reference to the following detailed description.

DETAILED DESCRIPTION

The present invention provides an antifog coating composition. In one aspect of the invention, the antifog composition comprises at least one polymer matrix, at least one hydrophilic component, and at least one surfactant. In one embodiment, the present invention further includes a thermal or a photo-initiator. In accordance with the present technology, the hydrophilic component is cross-linked into the polymer matrix upon curing the matrix. The coating provides good adhesion to a substrate along with excellent antifog properties. In particular, it has been found that incorporating a hydrophilic acrylate into the composition and polymer matrix provides a composition and coating exhibiting excellent antifog properties as well as other desired coating properties.

The polymer matrix may be chosen from suitable polymer materials including, but not limited to, thermoplastic elastomers, such as for example polyether esters, polyester esters, thermoplastic polyurethanes (TPU), styrene ethylene butadiene styrene (SEBS), acrylonitrile butadiene styrene (ABS), styrene acrylonitrile (SAN), polyamide (PA), acrylate styrene acrylate block copolymer (ASA), polybutylene terephthalate (PBT), polycarbonate (PC), polyether block amide (PEBA), polyalkyl methacrylates and acrylates, polyoxymethylene (POM), polyvinylchloride (PVC), polyether ether ketone (PEEK), polyimide (PI) or a combination of two or more thereof. Particularly suitable matrices include PMMA or PC.

In one embodiment, the matrix comprises at least about 45 wt %, in another embodiment at least about 50 wt %, in yet another embodiment at least about 55 wt %, in still yet another embodiment about at least about 60 wt %, in a further embodiment at least about 65 wt %, or in another further embodiment at least about 70 wt % of the total weight of the antifog composition.

In one embodiment, the matrix comprises from about 45 wt % to about 70 wt %, from about 45 wt % to about 65 wt %, from about 45 wt % to about 60 wt %, or from about 45 wt % to about 55 wt % of the composition. In another embodiment the matrix comprises from about 50 wt % to about 70 wt %, or in yet another embodiment from about 50 wt % to about 65 wt % of the composition.

In one embodiment, the matrix comprises less than about 70 wt % of the antifog composition, in another embodiment less than about 65 wt % and in yet another embodiment less than about 60 wt % of the antifog composition. In particular, it has been found that the adhesion to a substrate is improved when the polymer matrix material is at least about 50 wt %. Here as elsewhere in the specification and claims, numerical values can be combined to form new and non-disclosed ranges.

In one aspect, the hydrophilic component of the antifog composition includes at least one hydrophilic acrylate. In one embodiment, the hydrophilic acrylate may be chosen from a compound of the formula (I):

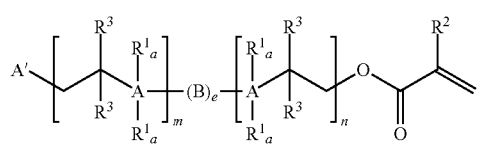

wherein:

$R_1$ is independently selected from the group consisting of O; H; a linear alkyl group containing from 1 to 5 carbon atoms; a linear alkyl group containing from 1 to 5 carbon atoms substituted with a hydroxy or an alkoxy group; an aromatic group; a hydroxy group; an alkoxy group containing from 1 to 3 carbon atoms; a methacrylate, and an acrylate group; wherein a is an integer from 0 to 1;

$R_2$ is independently chosen from H or $CH_3$;

$R_3$ is independently selected from the group consisting of H, an alkyl group having from 1 to 6 carbon atoms, a hydroxy group, an alkoxy group having from 1 to 3 carbon atoms, a methacrylate, and an acrylate group;

A is independently selected from the group consisting of O, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, an alkylene oxide, and a substituted or unsubstituted divalent heterocyclic group having from 5 to 20 carbon atoms;

A' is independently selected from H, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, a methacrylate, and an acrylate group;

B is independently selected from O, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, and a bisphenol A unit; wherein e is an integer from 0 to 1;

wherein n is an integer from 1 to 5 and m is an integer from 0 to 5.

In one embodiment, A may be a divalent hydrocarbon radical or may be an oxygen atom. The divalent hydrocarbon radical may be a substituted or unsubstituted aliphatic, cyclic, or aromatic containing radical. The divalent hydrocarbon radical may be an alkylene, cycloalkylene, alkenylene, or an arylene.

As used herein, the terms "alkylene", "cycloalkylene", "alkylene", "alkenylene", and "arylene" alone or as part of another substituent refers to a divalent radical derived from an alkyl, cycloalkyl, heteroalkyl, alkynyl, alkenyl, or aryl group, respectively. The respective radicals can be substituted or unsubstituted, linear or branched.

In embodiments, A is chosen from an oxygen atom, an alkylene (a divalent radical) group having 1 to 10 carbon atoms; an alkylene group having 2 to 8 carbon atoms; or an alkylene group having 4 to 6 carbon atoms. In embodiments, A is an alkylene group having 1 to 4 carbon atoms. In embodiments, A is methylene. In one embodiment, A is a divalent aryl radical having 6 to 30 carbon atoms. In embodiments, A is a phenyl radical, a tolyl radical, a xylyl radical, etc.

In one embodiment, A is a divalent heterocyclic group (having 5 to 20 carbon atoms). As used herein, the term "heterocyclic" refers to a cyclic compound that has atoms of at least two different elements as members of its ring(s) (e.g., carbon and oxygen). In one embodiment, the compound includes carbon and at least one heteroatom selected from nitrogen, oxygen, sulfur, phosphorus, or a combination of two or more thereof.

In one embodiment, the hydrophilic mono- or multifunctional acrylate is selected from a poly(ethyleneoxy)methacrylate, a poly(ethyleneoxy)acrylate, a poly(ethyleneoxy) monomethylether acrylate, a poly(ethyleneoxy) monomethylether methacrylate, a pentaerythritol triacrylate, a glycerol dimethacrylate, a glycerol diacrylate, a bisphenol-A-glycerol tetraacrylate, a bisphenol-A-glycerol diacrylate, a bisphenol-A-ethyleneoxy diacrylate, or a combination of two or more thereof.

Exemplary hydrophilic acrylates are shown below in formulae (I)(a)-I(j).

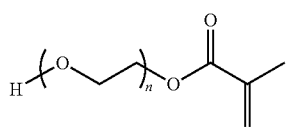
(I)(a)

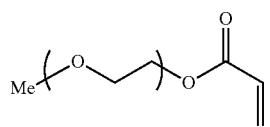
(I)(b)

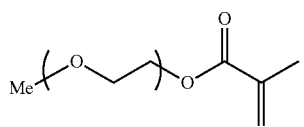
(I)(c)

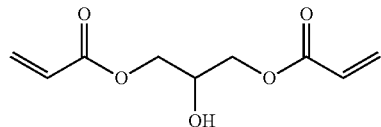
(I)(d)

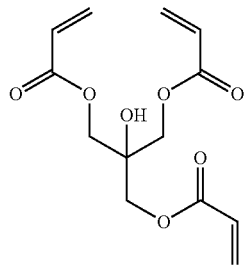
(I)(e)

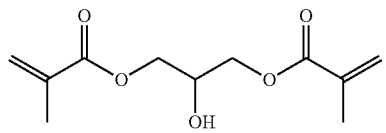
(I)(f)

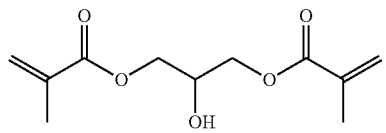
(I)(g)

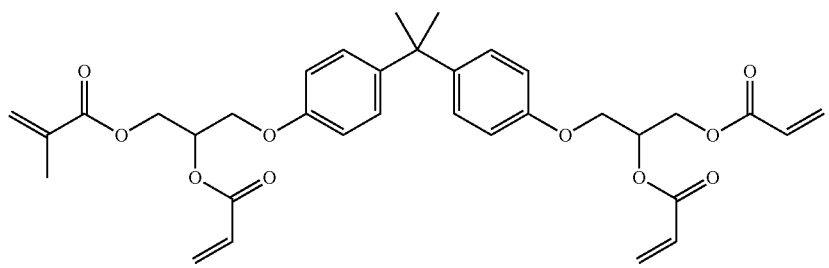
(I)(h)

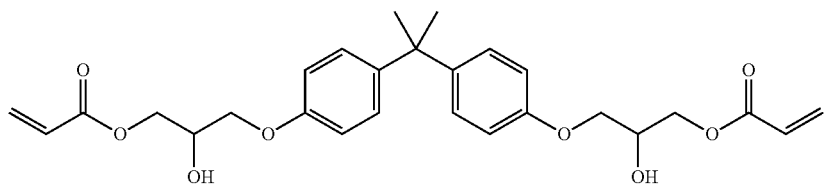
(I)(i)

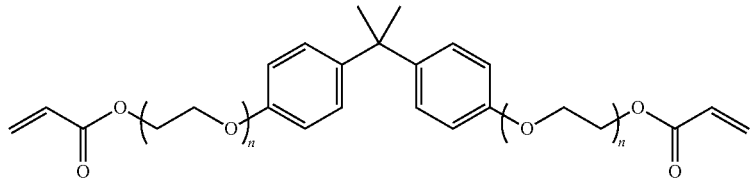
(I)(j)

In one aspect, the hydrophilic component of the antifog composition includes at least one hydrophilic epoxy compound. In one embodiment, the hydrophilic epoxy compound may be chosen from a compound of the formula (II):

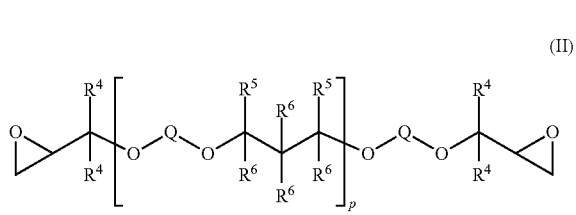

(II)

wherein:

$R_4$, $R_5$, and $R_6$ are independently chosen from H, a linear alkyl group having from 1 to 5 carbon atoms, an aromatic group, a hydroxy group, or an alkoxy group having from 1 to 3 carbon atoms;

Q is independently chosen from a linear alkylene group having from 1 to 6 carbon atoms, a cycloalkylene group having from 6 to 10 carbon atoms, a divalent aromatic group having 6 to 20 carbon atoms, or a divalent heterocyclic group having from 5 to 20 carbon atoms; and wherein p is an integer from 0 to 5.

In one embodiment, the hydrophilic epoxy compound is a bisphenol-A substituted epoxy groups of following formula (II)(a):

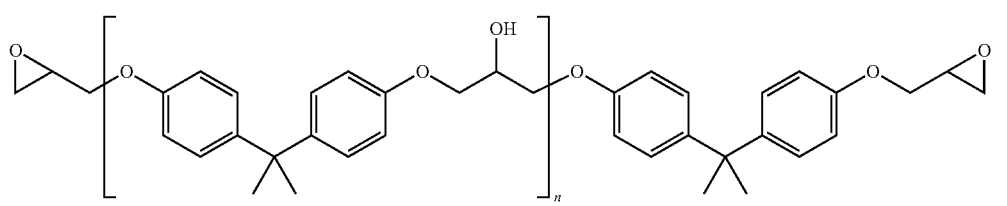

(II)(a)

wherein n=0 to 3

In one embodiment, the hydrophilic component is present in an amount of from about 15 wt % to about 30 wt %, in another embodiment from about 20 wt % to about 30 wt %, in yet another embodiment from about 25 wt % to about 30 wt %; in still yet another embodiment from about 15 wt % to about 25 wt %, or in a further embodiment from about 20 wt % to about 25 wt % based on the total weight of the antifog composition.

In one aspect of the invention, the antifog composition includes a surfactant. Suitable surfactants include, but are not limited to, non-ionic surfactants. Examples of suitable non-ionic surfactants include sorbitan esters, polyethoxylated sorbitan esters, polyoxyethylene glycol alkyl ethers; polyoxypropylene glycol alkyl ethers; glucoside alkyl ethers; polyoxyethylene glycol octylphenol ethers; polyoxyethylene glycol alkylphenol ethers; polyoxyethylene glycol sorbitan alkyl esters; sorbitan alkyl esters; or a combination of two or more thereof.

In one embodiment, the surfactant is chosen from a fatty alcohol, cetyl alcohol, stearyl alcohol, cetostearyl alcohol, oleyl alcohol or a combination of two or more thereof.

In one embodiment, the surfactant is selected from sorbitan esters; polyethoxylated sorbitan esters; oleochemical derivative (e.g. Finafog PET (tradename), from Fine Organics); PEG monolaurate; polyethylene glycol octadecyl ether (e.g., BRIJ® O20, from Sigma Aldrich); polyoxyethylene stearyl ether; polyoxyethylene nonylphenyl ether, branched (e.g, Igepal® CO 720, from Sigma Aldrich); poly(oxyethylene) tridecyl ether; PEG-20 sorbitan monolaurate (e.g, Tween® 20, from Sigma Aldrich); PEG-20 sorbitan monolearate (e.g, Tween® 80, from Sigma Aldrich); sorbitan monostearate (e.g., Span® 60, from Sigma Aldrich), methacrylate Tween® 20 (from Sigma Aldrich), $SiO_2$-Tween® 20 (from Sigma Aldrich), Grand 6047 (from Momentive), Ecosure EH-9 (from Dow Chemicals), Mecostat® 3/752 (from Mecastat), Mecostat® 3/749 (from Mecostat) or a combination of two or more thereof. In one embodiment, the surfactant is a suitable sorbitan ester. Suitable sorbitan esters include, but are not limited to Tweens (e.g., Tween® 20, Tween® 80, methacrylate Tween® 20, and $SiO_2$-Tween® 20 all are from Sigma Aldrich) and Spans (e.g., Span® 60).

In one embodiment, the surfactant is chosen from an oleochemical derivative (e.g, Finafog PET), PEG monooleate, PEG monolaurate, polyethylene glycol octadecyl ether (e.g., BRIJ® O20), polyoxyethylene nonylphenyl ether, branched (e.g, Ipegal® CO 720, poly(oxyethylene) tridecyl ether; PEG-20 sorbitan monolaurate (e.g, Tween® 20); PEG-20 sorbitan monolearate (e.g, Tween® 80; sorbitan monostearate (e.g., Span® 60), Methacrylate Tween® 20, $SiO_2$-Tween® 20, or a combination of two or more thereof.

In one embodiment the surfactant is chosen from:

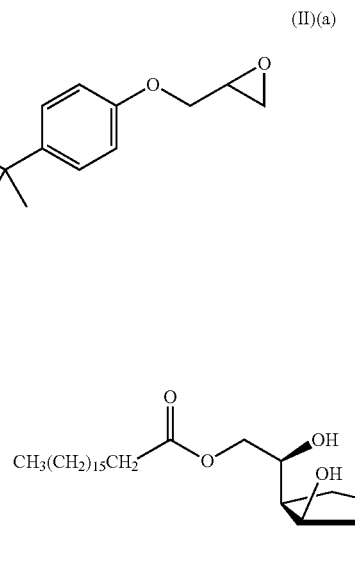

SPAN 60

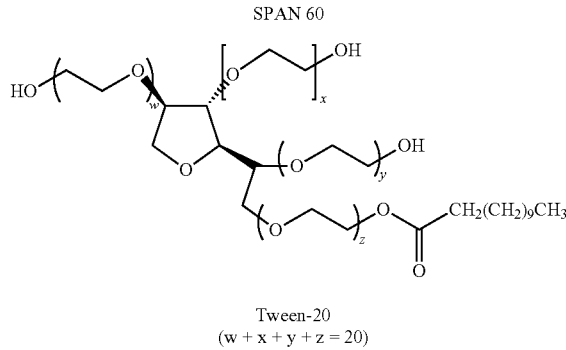

Tween-20
(w + x + y + z = 20)

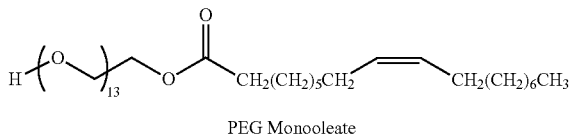

PEG Monooleate

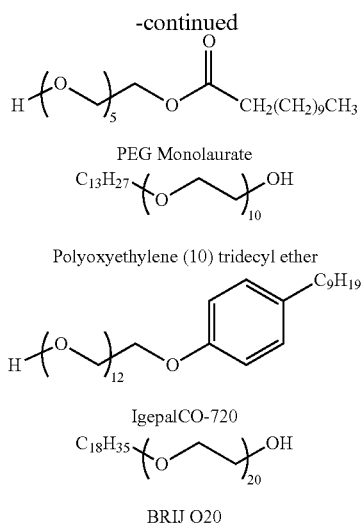

PEG Monolaurate

Polyoxyethylene (10) tridecyl ether

IgepalCO-720

BRIJ O20 or a combination of two or more thereof.

In one embodiment, the surfactant is present in an amount of from about 10 wt % to about 40 wt %, in another embodiment from about 15 wt % to about 30 wt %, in yet another embodiment from about 20 wt % to about 30 wt %, and in still yet another embodiment from about 25 wt % to about 30 wt %; and in a further embodiment from about 15 wt % to about 25 wt %, or in another further embodiment from about 20 wt % to about 25 wt % based on total weight of the antifog composition.

In one aspect of the invention, the antifog composition may include a photo-initiator. A photo-initiator can initiate free radical polymerization and/or cross-linking by the use of light. Suitable photo-initiators include, but are not limited to, benzoin methyl ether, diethoxyacetophenone, benzoylphosphine oxide, 2-hydroxy-2-methyl propiophenone (HMPP), 1-hydroxycyclohexyl phenyl ketone, 2-hydroxy-2-methyl-1-phenyl-propan-1-one (trade name: darocur 1173, from BASF), 1-[4-(2-hydroxyethoxy)-phenyl]-2-hydroxy-2-methyl-1-propane-1-one (trade name: Darocur 2959 from BASF) and 1-Hydroxycyclohexyl phenyl ketone (trade name: Irgacure 184 from BASF). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photo-initiators that can be incorporated, for example, into a macromer or can be used as a special monomer are also suitable. Examples of reactive photo-initiators include those disclosed in EP 632329, which is herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

In one embodiment, the photo-initiator is 1-hydroxycyclohexyl phenyl ketone (Irgacure® 184, from BASF), bis (2,4,6-trimethylbenzoyl)-phenylphosphineoxide (Irgacure® 819, from BASF), 2-hydroxy-2-methyl-1-phenyl-propan-1-one (Darocur® 1173, from BASF), 2,2-dimethoxy-1,2-diphenylethan-1-one (Irgacure® 651, from BASF), 2, 4, 6-trimethylbenzoylphenyl phosphinate (Lucirin® TPO-L, from BASF), (Lucirin® TPO-S from BASF), combination of two. In one embodiment, the thermal intiator is benzoyl peroxide (BPO) or 4,4'-azobisisobutyronitrile (AIBN) or combination of these two.

In one aspect of the invention, the antifog composition may include a thermal initiator. A thermal initiator can initiate free radical polymerization and/or cross-linking by the use of heat. Suitable thermal initiators include, but are not limited to tert-amyl peroxybenzoate; 4,4-azobis(4-cyanovaleric acid); 1,1'-azobis(cyclohexanecarbonitrile); 2,2'-azobisisobutyronitrile (AIBN); benzoyl peroxide (BPO); 2,2-bis(tert-butylperoxy)butane; 1,1-bis(tert-butylperoxy) cyclohexane; 2,5-bis(tert-butylperoxy)-2,5-dimethylhexane; 2,5-bis(tert-Butylperoxy)-2,5-dimethyl-3-hexyne; bis(1-(tert-butylperoxy)-1-methylethyl)benzene; 1,1-bis(tert-butylperoxy)-3,3,5-trimethylcyclohexane; tert-butyl hydroperoxide; tert-butyl peracetate; tert-butyl peroxide; tert-butyl peroxybenzoate; tert-butylperoxy isopropyl carbonate; cumene hydroperoxide; cyclohexanone peroxide; dicumyl peroxide; lauroyl peroxide; 2,4-pentanedione peroxide; peracetic acid; potassium persulfate.

In one embodiment, the thermal initiator is benzoyl peroxide (BPO) or 4,4'-azobisisobutyronitrile (AIBN) or combination of these two.

In one embodiment, the photo-initiator is present in an amount of from about 1 wt % to about 6 wt % or in another embodiment from about 2 wt % to about 4 wt %, based on total weight of the antifog composition.

In one embodiment, the antifog composition comprises a coating formulation comprising from about 10 wt % to about 70 wt % thermoplastic matrix; from about 10 wt % to about 40 wt % hydrophilic mono or multifunctional acrylates; and from about 10 wt % to about 40 wt % surfactant, based on total weight of the antifog composition. In one embodiment, the coating formation further includes about 1 wt % to about 5 wt % of a thermal or a photo-initiator.

In one embodiment of the invention, the matrix includes poly(methylmethacrylate)(PMMA); the hydrophilic component is chosen from glycerol dimethacrylate, bisphenol A glycerolate diacrylate, bisphenol A ethoxylate diacrylate, or a combination of two or more thereof; and a surfactant chosen from an oleochemical derivative (e.g, Finafog PET), poly(ethyleneglycol) monolaurate, poly(ethyleneglycol) monooleate, poly(ethyleneglycol) sorbitan monolaurate (e.g., Tween 20), poly(oxyethylene) (10) tridecyl ether, polyethylene glycol octadecyl ether (e.g., BRIJ® 20), polyoxyethylene nonylphenyl ether, branched (e.g, Igepal® 720), Sorbitan stearate (e.g., Span® 60), or a combination of two or more thereof.

In one aspect of the invention, the antifog compositions comprises a hydrophilic acrylate such as poly(ethyleneoxy) methacrylate, poly(ethyleneoxy)acrylate, poly(ethyleneoxy) monomethylether acrylate, poly(ethyleneoxy)monomethylether methacrylate, pentaerythritol triacrylate, glycerol dimethacrylate, glycerol diacrylate, bisphenol-A-glycerol tetraacrylate, bisphenol-A-glycerol diacrylate, bisphenol-A-ethyleneoxy diacrylate, or a combination of two or more thereof added onto the matrix comprising a thermoplastic (e.g., PMMA) and at least one surfactant selected from, an oleochemical derivative (e.g, Finafog PET), poly(ethyleneglycol) monolaurate, poly(ethyleneglycol) monooleate, poly(ethyleneglycol) sorbitan monolaurate (e.g., Tween® 20), poly(oxyethylene) (10) tridecyl ether, polyethylene glycol octadecyl ether (e.g., BRIJ® 20), polyoxyethylene nonylphenyl ether, branched (e.g, Igepal® 720), sorbitan stearate (e.g., Span® 60), or a combination of two or more thereof.

The antifog composition may be applied to suitable polymeric substrates that may include, but are not limited to, organic polymeric materials such as acrylic polymers, e.g., poly(methylmethacrylate), polyamides, polyimides, acrylonitrile-styrene copolymer, styrene-acrylonitrile-butadiene terpolymers, polyvinyl chloride, polyethylene, polycarbonates, copolycarbonates, high-heat polycarbonates, and any other suitable material.

The antifog composition may be applied to the substrate as a film or coating that has a thickness (e.g., dry film thickness) in a range of about 0.5 μm to about 25 μm; in another embodiment from about 1 μm to about 20 μm; in yet another embodiment from about 1 μm to about 25 μm; in still yet another embodiment from about 0.5 μm to about 20 μm; in a further embodiment from about 1 μm to about 15 μm; in an even further embodiment from about 1 μm to about 10 μm; or in still an even further embodiment from about 1 μm to about 5 μm. In one embodiment, the film or coating has a thickness in a range of about 4 μm to about 20 μm; in another embodiment from about 5 μm to about 25 μm; in yet another embodiment from about 5 μm to about 25 μm; in still yet another embodiment from about 5 μm to about 20 μm; in a further embodiment from about 5 μm to about 15 μm; or in yet another further embodiment from about 5 μm to about 10 μm. In an embodiment, the film or coating has a thickness of less than about 50 μm; and in another embodiment less than about 30 μm.

The antifog composition may be thermal or UV cured after applying the formulation onto a suitable polymeric substrate (e.g., polycarbonate substrates) thereby covalently cross-linking the hydrophilic diacrylates into the polymer matrix. The polymer matrix (primer matrix) provides excellent adhesion to a substrate (e.g., polycarbonate), mechanical durability, and very good optical clarity. The hydrophilic component and the photo-initiator undergo covalent cross-linking and are then incorporated into the thermoplastic matrix (e.g., PMMA).

As previously described, the present antifog compositions can be used to coat a variety of substrates. The compositions are particularly suitable to provide a coating to prevent or substantially limit fogging of such substrates. As such, substrates coated with the present antifog coating compositions may be used in a variety of applications including, but not limited to, automobile headlights, windshields, eyeglasses, goggles, mirrors, storage containers, windows, camera lens, etc.

The following examples are illustrative and not to be construed as limiting of the technology as disclosed and claimed herein.

Examples

Various coating formulations with different ratios of PMMA, hydrophilic mono- or multifunctional (meth) acrylate and surfactants were prepared and tested to evaluate various properties such as adhesion, fogging, humidity, contact angle, and others. Testing was conducted using the following tests:

Optical Measurements: The % Transmittance and Haze were measured using BYK Haze Gard™ Instrument ASTM D1003 (BYK instruments).

Film metrics: The thicknesses of the coated films were measured using filmmetrics using the refractive index of the coated materials.

Fog Test Studies: Tests were performed according to the ASTM test standards D1735-14. The coated panels were subjected to Fog Test Studies at 60° C.

Water Soak Adhesion Test: The initial adhesion was measured using a cross hatch adhesion test according to ASTM D3002/D3359. The adhesion is rated in a scale of 5 B-0 B, TB indicative of highest adhesion. Adhesion after water immersion was done by immersing the coated panels in 65° C. hot water followed by cross hatch adhesion test at different time intervals.

Humidity Test: Initial optical properties as well as anti-fog property was measured as mentioned above. Then the coated substrates were placed in a Humidity chamber with relative humidity (R.H.) 60% and 85% at room temperature as well as at 85° C. After the treatment, the substrates were subjected to optical property measurement as well as the anti-fog property.

Contact Angle Measurements: The water contact angle values were measured by placing 5 μl water droplets onto the coated substrate using a Goniometer. Three measurements were made and the average value was recorded.

Preparation of Anti-Fogging Coating Resin

Coating of Antifog Resin onto PC Substrate—Flow Coating Method

The PC substrates were cleaned with isopropanol and dried at room temperature (RT) for 20 min. The filtered solutions of above antifog resin formulation were flow coated onto the PC substrate, by applying the coating solution using a squeeze bottle. The coated substrates were air-dried at room temperature for 5 min and subsequently at 75° C. for 5 min in an air-oven. The substrates were then cured in the UV curing machine with UVA intensity of 30-150 mW/cm$^2$. The antifog film coated PC substrates were subjected to fog testing and optical measurements.

Composition with PMMA, Hydrophilic Mono- (or) Multifunctional (Meth) Acrylates and Different Surfactants The formulations were made with PMMA (45-55 wt %), glycerol dimethacrylate (20-25 wt %) and surfactants (20-25 wt %) (PEG monolaurate, BRIJ® O20, P2393 and Igepal® CO 720, Tween® 20, Methacrylate Tween® 20, Tween® 20 functionalized Silica NPs, Grand 6047, Ecosure EH-9, Mecostat® 3/752, Mecostat® 3/749). Each formulation was coated on a PC substrate and then the optical properties were measured and subjected to fog test at 60° C. In formulations lacking a surfactant, the PC substrate fogged immediately. When the coating formulation included a surfactant, the PC substrate showed anti-fogging behavior as shown below in Table 1. The presence of surfactant plays a key role in obtaining the antifog behavior.

TABLE 1

Properties of Antifog coatings with different surfactants
Here the composition is PMMA 45-55%; Bisphenol-A-ethoxylate diacrylate 20-25%; Irgacure 184 - (2-6) %; Surfactant listed below (20-25%) in Table 1 for Examples 1-13. Comparative Example 1 (no surfactant), it is PMMA - 65-75%; Bisphenol-A-ethoxylate diacrylate-18-23%; Irgacure ® 184 (1-5%).

| Example | Additive/Surfactant | % T | Haze | Fogging Time (Sec) |
|---|---|---|---|---|
| Comparative Example 1 | No Surfactant | 89.0 | 0.65 | 2-5 Sec. |
| Example 2 | Finafog PET | 89.3 | 0.89 | >45 Sec. |
| Example 3 | Igepal ® 720 | 89 | 0.24 | >45 Sec. |
| Example 4 | PEG monolaurate | 89 | 0.32 | >45 Sec. |
| Example 5 | BRIJ ® O20 | 89 | 0.73 | >45 Sec. |
| Example 6 | P2393 | 88.9 | 0.36 | >45 Sec. |
| Example 7 | Tween ® 20 | 89.0 | 0.2 | >45 Sec |
| Example 8 | SiO$_2$-Tween ® 20 | 89.2 | 0.73 | >45 Sec |
| Example 9 | Methacrylate Tween ® 20 | 88.4 | 0.33 | >45 Sec |
| Example 10 | Grand 6047 | 88.6 | 0.43 | >45 Sec. |
| Example 11 | Ecosure EH-9 | 88.5 | 0.39 | >45 Sec. |

TABLE 1-continued

Properties of Antifog coatings with different surfactants
Here the composition is PMMA 45-55%; Bisphenol-A-ethoxylate
diacrylate 20-25%; Irgacure 184 - (2-6) %; Surfactant listed
below (20-25%) in Table 1 for Examples 1-13. Comparative
Example 1 (no surfactant), it is PMMA - 65-75%; Bisphenol-A-
ethoxylate diacrylate-18-23%; Irgacure ® 184 (1-5%).

| Example | Additive/Surfactant | % T | Haze | Fogging Time (Sec) |
|---|---|---|---|---|
| Example 12 | Mecostat ® 7/352 | 88.5 | 0.36 | >45 Sec. |
| Example 13 | Mecostat ® 7/349 | 88.8 | 0.33 | >45 Sec. |

Example 1 contained the following formulation: PMMA (72 wt %), Bisphenol-A-ethoxylate diacrylate (22 wt %), Surfactant (0 wt %), Irgacure® 184 (4 wt %).

Example 2-13 contained the following formulation: PMMA (52 wt %), Bisphenol-A-ethoxylate diacrylate (22 wt %), Surfactant (22 wt %), Irgacure® 184 (4 wt %).

Composition with PMMA, Finafog PET and Different Hydrophilic Multifunctional (Meth)Acrylates Formulation were made with PMMA (52 wt %), Finafog PET (22 wt %) and one of the three hydrophilic acrylates namely, Glycerol dimthacrylate (or) Bisphenol-A-ethoxylate diacrylate (or) Bisphenol-A-glycerolate diacrylate (22 wt %) and 4 wt % photoinitiator. PC Substrates were cleaned with deionized water and isopropanol and dried at room temperature for 20 min. prior to coating. These formulations were each flow coated on a PC substrate and then the optical properties were measured. Each PC substrate was subjected to fog test at 60° C. PC substrates coated with a formulation containing these hydrophilic acrylates showed antifog properties as shown below in Table 2. It appears that covalently cross-linking hydrophilic monomers along with the surfactants to the polymeric system (e.g., PMMA), it is possible to fabricate antifog coating.

TABLE 2

Properties of Antifog coatings with different hydrophilic acrylates
Here the composition is PMMA 52%; Finafog PET 22%;
Irgacure ® 184 - 4%; Hydrophilic multi-functional
(meth) acrylates (22%) as shown in Table 2.

| Example | Hydrophilic Multifunctional (meth)acrylates | % T | Haze | Fogging Time (Sec) |
|---|---|---|---|---|
| Example 14 | Glycerol Dimethacrylate | 89.3 | 0.89 | >45 Sec. |
| Example 15 | Bisphenol-A-Glycerolate diacrylate | 89.0 | 0.46 | >45 Sec. |
| Example 16 | Bisphenol-A-Ethoxylate diacrylate | 91.2 | 0.43 | >45 Sec. |

Example 17 contained the following formulation: PMMA (52%), Hydrophilic mono- (or) multi-functional (meth)acrylate (22%), Surfactant (Finafog PET) (22%) and photoinitiator (Irgacure®️ 184) (4%).

Example 18 contained the following formulation: PMMA (60%), Hydrophilic mono- (or) multi-functional (meth)acrylate (18%), Surfactant (Finafog PET) (18%) and photoinitiator (Irgacure®️ 184) (4%).

Polycarbonate substrates (PC substrates) were coated separately with either the coating of Example 17 or Example 18. Various properties of the coating were evaluated. The results of the various testing methods are summarized below in Table 3.

TABLE 3

Summary of various testing methods of Examples 17 and 18.

| Test Studies | Properties | Comparative Example PC Substrate - No Coating | PC - Antifog Coating Example 17 | PC - Antifog Coating Example 18 |
|---|---|---|---|---|
| Water soak Adhesion Test @ 65° C. for 10 days | Adhesion | N/A | 5B | 5B |
| Humidity Chamber @ 85° C. & R.H. 85% | Antifog (Before) | 1-2 Sec. | >30 Sec | >30 Sec |
| | After treatment | 1-2 Sec. | >30 Sec | >30 Sec |
| Boiling Water Soak Test @ 100° C. for 1 h | Antifog (Before) | 1-2 Sec. | >30 Sec | >30 Sec |
| | After treatment | 1-2 Sec. | 3-8 Sec. | 4-8 Sec. |
| Repeated Fog Cycles (up to 15 cycles) | Antifog | 1-2 Sec. | >30 Sec | >30 Sec |
| Heat Treatment @ 130° C. for 1 h | Antifog (Before) | 1-2 Sec. | >30 Sec | >30 Sec |
| | After treatment | 1-2 Sec. | >30 Sec | >30 Sec |

Formulations were also tested to determine ideal ranges for reagents including amounts for thermoplastic matrices, hydrophilic acrylates, and surfactants. Table 4 below describes Formulations 1-5, which were assessed for suitable antifog properties and suitable adhesion to substrate.

TABLE 4

Assessment of Various Amounts of Reagents

| Composition | PMMA | Hydrophilic Monomers | Surfactants | Antifog Property | Adhesion to Substrate |
|---|---|---|---|---|---|
| A | 40% | 30% | 30% | Yes | No |
| B | 70% | 15% | 15% | Yes | Yes |
| C | 80% | 10% | 10% | No | Yes |
| D | 50% | 20% | 30% | Yes | Yes |
| E | 52% | 22% | 22% | Yes | Yes |

Various coating formulations with different ratios of thermoplastic matrix, glycerol dimethacrylate, and Finafog PET were prepared and tested to evaluate anti-fogging properties and adhesion to substrate (Table 4). Embodiments of the invention showed no fogging, good adhesion to the substrate, and good optical clarity.

While the invention has been described with reference to various exemplary embodiments, it will be appreciated that modifications may occur to those skilled in the art, and the present application is intended to cover such modifications and inventions as fall within the spirit of the invention.

What is claimed is:

1. An antifog coating composition comprising at least one thermoplastic matrix, at least one hydrophilic compound, and at least one surfactant, wherein the at least one hydrophilic compound is a hydrophilic acrylate having formula (I):

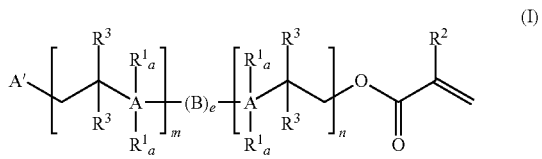

wherein:
$R_1$ is independently selected from the group consisting of O; H; a linear alkyl group containing from 1 to 5 carbon atoms; a linear alkyl group containing from 1 to 5 carbon atoms substituted with a hydroxy or an alkoxy group; an aromatic group; a hydroxy group; an alkoxy group containing from 1 to 3 carbon atoms; a methacrylate, and an acrylate group; wherein a is an integer from 0 to 1;
$R^2$ is independently chosen from H or $CH_3$;
$R^3$ is independently selected from the group consisting of H, an alkyl group having from 1 to 6 carbon atoms, a hydroxy group, an alkoxy group having from 1 to 3 carbon atoms, a methacrylate and an acrylate group;
A is independently selected from the group consisting of O, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, an alkylene oxide, and a substituted or unsubstituted divalent heterocyclic group having from 5 to 20 carbon atoms;
A' is independently selected from H, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, a methacrylate and an acrylate group;
B is independently selected from 0, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, and a bisphenol A unit e is an integer from 0 to 1;
wherein n is an integer from 1 to 5 and m is an integer from 0 to 5.

2. The antifog coating composition of claim 1, further comprising at least one photo-initiator or at least one thermal initiator.

3. The antifog coating composition of claim 1, wherein the at least one hydrophilic acrylate is selected from the group consisting of a poly(ethyleneoxy)methacrylate, a poly(ethyleneoxy)acrylate, a poly(ethyleneoxy)monomethylether acrylate, a poly(ethyleneoxy)monomethylether methacrylate, a pentaerythritol triacrylate, a glycerol dimethacrylate, a glycerol diacrylate, a bisphenol-A-glycerol tetraacrylate, a bisphenol-A-glycerol diacrylate, a bisphenol-A-ethyleneoxy diacrylate, and a combination thereof.

4. The antifog coating composition of claim 1, wherein the at least one thermoplastic matrix is selected from the group consisting of a polyether ester, a polyester ester, a thermoplastic polyurethane, a styrene ethylene butadiene styrene, an acrylonitrile butadiene styrene, a styrene acrylonitrile, polyamide, an acrylate styrene acrylate block copolymer, polybutylene terephthalate, a polycarbonate, a polyether block amide, a polymethyl methacrylate, a polyoxymethylene, a polyvinylchloride, and a combination thereof.

5. The antifog coating composition of claim 1, wherein the at least one thermoplastic matrix is chosen from polycarbonate, polymethyl methacrylate, or a combination thereof.

6. The antifog composition of claim 1, wherein the at least one surfactant is selected from the group consisting of a sorbitan ester, a polyethoxylated sorbitan ester, a polyoxyethylene glycol alkyl ether, a polyoxypropylene glycol alkyl ether, a glucoside alkyl ether, a polyoxyethylene glycol octylphenol ether, a polyoxyethylene glycol alkylphenol ether, a polyoxyethylene glycol sorbitan alkyl ester, a sorbitan alkyl ester, and a combination thereof.

7. The antifog coating composition of claim 1, wherein the at least one thermoplastic matrix is present in an amount of about 10 wt % to about 70 wt %, the at least one hydrophilic acrylate is present in an amount of about 10 wt % to about 40 wt %, and the at least one surfactant is present in an amount of about 10 wt % to about 40 wt %, each weight percent based on the total weight of the composition.

8. The antifog composition of claim 7, further comprising at least one photo-initiator present in an amount of about 1 wt % to about 5 wt %.

9. An antifog coating composition comprising:
(a) at least one acrylate matrix;
(b) at least one hydrophilic acrylate having the formula (I) or formula (II):

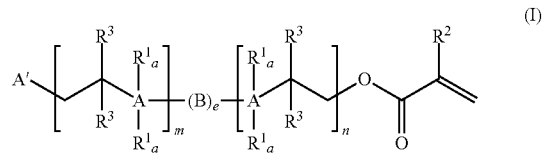

wherein:
$R_1$ is independently selected from the group consisting of 0; H; a linear alkyl group having from 1 to 5 carbon atoms optionally substituted by a hydroxy or an alkoxy group; an aromatic group; a hydroxy group; an alkoxy group having from 1 to 5 carbon atoms; a methacrylate; and an acrylate group; wherein a is an integer from 0 to 1;

$R^2$ is independently chosen from H or $CH_3$;

$R^3$ is independently selected from the group consisting of H, an alkyl group having 1 to 6 carbon atoms, a hydroxy group, an alkoxy group having from 1 to 3 carbon atoms, a methacrylate and an acrylate group;

A is independently selected from the group consisting of 0, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, an alkylene oxide, and a substituted or unsubstituted divalent heterocyclic group having from 5 to 20 carbon atoms;

A' is independently selected from the group consisting of H, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms, a methacrylate, and an acrylate group;

B is independently selected from 0, a substituted or unsubstituted linear alkyl group having from 1 to 20 carbon atoms, a substituted or unsubstituted cycloalkyl group having from 1 to 20 carbon atoms, a substituted or unsubstituted divalent aromatic group having from 6 to 20 carbon atoms, a substituted or unsubstituted divalent heterocyclic group having from 5 to 20 carbon atoms and a bisphenol A unit; wherein e is an integer from 0 to 1;

wherein n is an integer from 1 to 5 and m is an integer from 0 to 5; or (II)

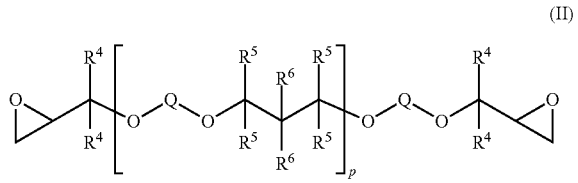

wherein $R_4$, $R_5$, and $R_6$ are independently selected from the group consisting of H, a linear alkyl group having from 1 to 5 carbon atoms, an aromatic group, a hydroxy group, and an alkoxy group having from 1 to 3 carbon atoms;

Q is independently selected from the group consisting of a linear alkylene group having from 1 to 6 carbon atoms, a cycloalkylene group having from 1 to 10 carbon atoms, a divalent aromatic group having from 6 to 20 carbon atoms, and a divalent heterocyclic group having from 5 to 20 carbon atoms;

wherein p is an integer from 0 to 5; and (c) at least one non-ionic surfactant.

10. The antifog coating composition of claim 9, wherein the at least one hydrophilic acrylate is selected from the group consisting of a poly(ethyleneoxy)methacrylate, a poly(ethyleneoxy)acrylate, a poly(ethyleneoxy)monomethylether acrylate, a poly(ethyleneoxy)monomethylether methacrylate, a pentaerythritol triacrylate, a glycerol dimethacrylate, a glycerol diacrylate, a bisphenol-A-glycerol tetraacrylate, a bisphenol-A-glycerol diacrylate, a bisphenol-A-ethyleneoxy diacrylate, and a combination thereof.

11. The antifog coating composition of claim 9, wherein the at least one non-ionic surfactant is selected from the group consisting of a sorbitan ester, a polyethoxylated sorbitan ester, a polyoxyethylene glycol alkyl ether, a polyoxypropylene glycol alkyl ether, a glucoside alkyl ether, a polyoxyethylene glycol octylphenol ether, a polyoxyethylene glycol alkylphenol ether, a polyoxyethylene glycol sorbitan alkyl ester, a sorbitan alkyl ester and a combination thereof.

12. The antifog coating composition of claim 9, wherein the at least one acrylate matrix is present in an amount of about 10 wt % to about 70 wt %, the at least one hydrophilic acrylate is present in an amount of about 10 wt % to about 40 wt %, and the non-ionic surfactant is present in an amount of about 10 wt % to about 40 wt %, each weight percent based on total weight of the composition.

13. The antifog composition of claim 12, further comprising a photo-initiator present in an amount of about 1 wt % to about 5 wt %.

14. An article comprising a substrate and the antifog coating composition of claim 1 disposed on at least a portion of a surface thereof.

15. The article of claim 14, wherein:
a) the thermoplastic matrix is polymethyl methacrylate and is present from about 10 wt % to about 70 wt %;
b) the hydrophilic compound is hydrophilic acrylate and is present from about 10 wt % to about 40 wt %;
c) the surfactant is a non-ionic surfactant and is present from about 10 wt % to about 40 wt %; and
d) the antifog coating composition further comprising (1) about 1 wt % to about 5 wt % photo-initiator or (2) 1 wt % to about 5 wt % thermal initiator,
wherein each wt % is based on the total weight of the composition.

16. The article of claim 14, wherein the substrate is selected from the group consisting of an acrylic polymer, a polyamide, a polyimide, an acrylonitrile-styrene copolymer, a styrene-acrylonitrile-butadiene terpolymer, a polyvinyl chloride, a polyethylene, a polycarbonate, a copolycarbonate and a combination thereof.

17. The article of claim 14, wherein the substrate is polycarbonate.

18. The article of claim 14, wherein the article is an automobile headlight, a windshield, eyeglasses, goggles, a mirror, a storage container, a window or a camera lens.

19. The article of claim 14 wherein the article has a fogging time, as measured in accordance with the Fog Test Studies, of greater than 45 seconds.

* * * * *